(12) United States Patent
Andoh et al.

(10) Patent No.: US 7,155,592 B2
(45) Date of Patent: Dec. 26, 2006

(54) SYSTEM AND METHOD FOR ONBOARD HDD DEFRAGMENTATION AND COMBINING MULTIPLE G-LIST ENTRIES

(75) Inventors: Haruo Andoh, Yamato (JP); Masaki Kohno, San Jose, CA (US)

(73) Assignee: Hitachi Global Storage Technologies Netherlands, B.V., Amerstdam (NL)

( * ) Notice: Subject to any disclaimer, the term of this patent is extended or adjusted under 35 U.S.C. 154(b) by 400 days.

(21) Appl. No.: 10/837,653

(22) Filed: May 3, 2004

(65) Prior Publication Data
US 2005/0262384 A1 Nov. 24, 2005

(51) Int. Cl.
*G06F 12/02* (2006.01)

(52) U.S. Cl. ..................................... 711/165

(58) Field of Classification Search ................ 711/165, 711/112; 714/8
See application file for complete search history.

(56) References Cited

U.S. PATENT DOCUMENTS

| | | | | |
|---|---|---|---|---|
| 5,917,724 A | | 6/1999 | Brousseau et al. ........... | 364/186 |
| 6,470,461 B1 | * | 10/2002 | Pinvidic et al. ................ | 714/8 |
| 6,735,678 B1 | * | 5/2004 | Noble et al. ................ | 711/165 |

* cited by examiner

*Primary Examiner*—Kevin L. Ellis
(74) *Attorney, Agent, or Firm*—John L. Rogitz (57) ABSTRACT

A HDD defragments itself while idle or in self-test when a defragmentation count exceeds a threshold. Also, the HDD combines G-list entries when a discontinuity count and a G-list entry density are both over a threshold.

26 Claims, 6 Drawing Sheets

*Fig. 4*
LOGIC FOR COMBINING G-LIST ENTRIES

Fig.5
DEFRAGMENT LOGIC

SYSTEM AND METHOD FOR ONBOARD HDD DEFRAGMENTATION AND COMBINING MULTIPLE G-LIST ENTRIES

FIELD OF THE INVENTION

The present invention relates to hard disk drives.

BACKGROUND OF THE INVENTION

When an error occurs in a hard disk drive (HDD) due to smear, track squeeze, adjacent track interference, etc. affected sectors are reallocated, i.e., the logical block addresses (LBA) of the sectors are reallocated to a spare track. The LBAs of the reallocated sectors are contained in a so-called "grown defect list", or "G-list" for short, which essentially is a list to which defects can be added as they are detected by error detection logic executed by the controller of the HDD.

It happens that when sectors are reallocated to spare tracks as a result of error recovery procedures, related LBAs may not be physically positioned next to each other. This is referred to as "fragmentation". Fragmentation degrades HDD performance because extended seek time may be required to locate the related but physically separated blocks. Also, the HDD might have to wait for a complete extra revolution to read data that is fragmented, further degrading performance.

A user of a computer in which the HDD is mounted can cause the processor of the computer to execute defragmentation logic, but as recognized herein this is less than optimum. It requires user recognition of the need for defragmenting, and until that happens the HDD may perform substandardly. Also, the computer processor does not have access the G-list of the HDD, so that certain information such as LBA cross-referencing that can be contained in a G-list is not available to the computer.

In addition to the above-recognized drawbacks with current defragmentation methods, the present invention understands that the G-list as it grows can consume valuable space within the HDD, and that it consequently would be desirable to minimize the physical size of the G-list when possible.

SUMMARY OF THE INVENTION

A hard disk drive (HDD) includes at least one disk storing data and a disk controller that is configured for accessing a grown defect list (G-list) to defragment the disk and to combine entries in the G-list.

In a non-limiting implementation the controller can determine whether to invoke defragmentation based on a defragmentation count. The defragmentation count can be incremented if spare sectors in the G-list are not ordered by size, from small to big. Also, defragmentation and G-list entry combination preferably are not executed unless the HDD is in an idle state or a self-test state.

With respect to non-limiting ways to implement G-list entry combination, the controller may determine whether to invoke G-list entry combination based at least in part on a discontinuity count, which can be incremented if at least two successive entries in the G-list are physically located on the same track in the same head and cylinder. Also, the non-limiting controller can use a density to decide whether to combine entries. The density can be obtained as the quotient of the difference between two physical locations of G-list entries and the discontinuity count.

In another aspect, a chip is configured for placement within a hard disk drive (HDD) for defragmenting data in the HDD and/or for combining at least two entries on a grown defects list (G-list) into a single entry on the list.

In still another aspect, in a hard disk drive (HDD) having a grown defects list (G-list), means are provided for combining at least two G-list entries under one logical block address (LBA). If desired, means may also be provided for defragmenting information in the HDD.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
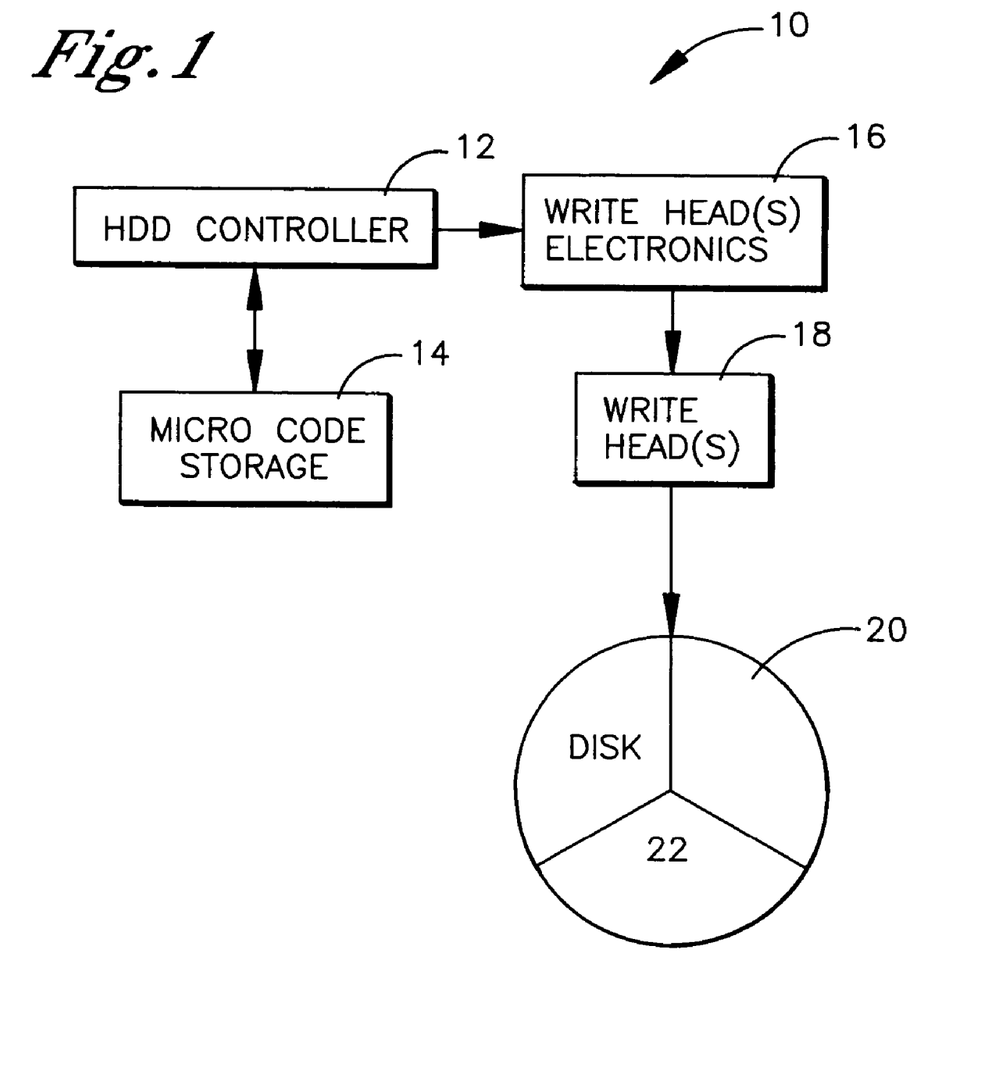
FIG. 1 is a block diagram of the present hard disk drive (HDD)

Referring initially to FIG. 1, a hard disk drive (HDD) is shown, generally designated 10, which includes a hard disk drive controller 12 that can include and/or be implemented by a microcontroller. The controller 12 may access electronic data storage such as a microcode storage 14 that may be implemented by a solid state memory device. The microcode storage 14 can store microcode embodying the lists and operating logic discussed further below.

The HDD controller 12 controls electronics 16 that are associated with one or more heads 18 for writing data onto one or more disks 20. Non-limiting implementations of the HDD 10 include plural heads and plural disks 20, and each head 18 is associated with a respective read element for, among other things, reading data on the disks 18 and a respective write element for writing data onto the disks 20.

As stated above, the logic disclosed below may be contained in a storage 14 that is separate from the HDD controller 12, or the storage 14 may be integrated into the controller 12. Or, it may be contained in the electronics 16, or on chipsets that are separate from the controller 12 and electronics 16. The logic may be distributed through the components mentioned above, and may be implemented in hardware logic circuits and/or software logic circuits.

FIG. 1 also shows that each disk 20 may include plural portions 22. In one implementation, the portions 22 are established by disk sectors and/or disk zones.

Figure 2:
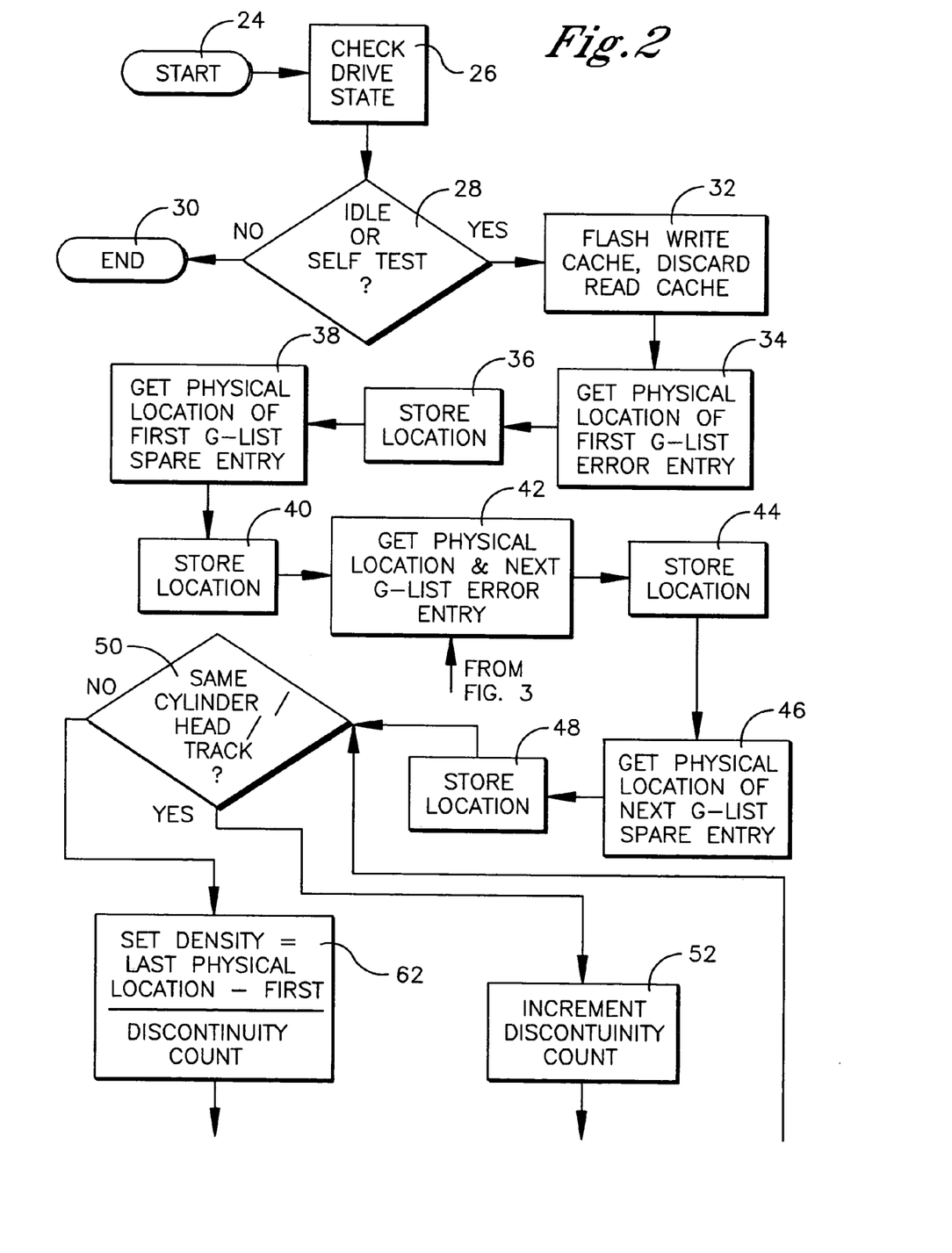
FIG. 2 is a flow chart of the logic for determining whether to invoke the defragmentation logic and the G-list entry combination logic.

Now referring to FIG. 2, the logic for determining whether to invoke the defragmentation logic and G-list entry combination logic may be seen in exemplary, non-limiting flow chart format. A G-list may be a list of logical block addresses (LBAs) of spare sectors and/or other sectors that have been reallocated as a result of errors on the disk. For instance, a G-list can contain the LBAs of sectors having errors and the LBAs of spare sectors.

Commencing at state 24, the logic for deciding whether to defragment and/or combine G-list entries begins and moves to block 26, wherein the state of the HDD is checked. If it is not idle or in a self-test mode, the logic ends at state 30;

otherwise, the logic continues to block 32 to flush the write cache of the HDD and discard the read cache.

Proceeding to block 34, the physical location of the first error entry on the G-list is obtained. The first error entry lists the LBA of the first sector on the G-list having an error in it. This physical location is stored at block 36, and then at block 38 the physical location of the first spare entry on the G-list is obtained. The first spare entry lists the LBA of the first sector on the G-list that can be used as a spare, and is associated with the first error entry. This physical location is stored at block 40.

Proceeding to block 42, the physical location of the next error entry on the G-list is obtained and is stored at block 44. At block 46 the physical location of the corresponding (next) spare entry on the G-list is obtained and stored at block 48.

As shown in the exemplary logic of FIG. 2, once the physical locations have been obtained as set forth above, the logic proceeds to decision diamond 50 to determine whether all four entries (the two error entries and their corresponding spare sector entries) are on the same head, same cylinder, and same track. If they are, a discontinuity counter is incremented by one at block 52, and the logic moves to decision diamond 54. There, it is determined whether the spare sectors are not listed in the G-list from small to big. If the test at decision diamond 54 is positive, meaning that the spare sectors under test are not listed from small to big, a defragment count is incremented by one at block 56.

From block 56, or from decision diamond 54 if the spare sectors under test are listed in the G-list from small to big, the logic moves to decision diamond 58 to determine whether the spare sectors under test are on different tracks. If they are, the defragmentation count is incremented by one at block 60. From block 60 or from decision diamond 58 in the event that the spare sectors are not on different tracks, the logic loops back to decision diamond 50.

As shown in FIG. 2, if it is determined that the locations under test are not all on the same head, same cylinder, and same track, the logic moves to block 62 to define a density as being equal to the quotient of the difference between the physical location of the last-listed spare sector under test and the first-listed spare sector under test, and the discontinuity count, i.e., Density=[phys. loc. of last spare sector–phys. loc. of first spare sector]/discon. count At decision diamond 64 it is determined whether the discontinuity count bears a predetermined relationship to (e.g., exceeds) a threshold. If so, the logic then determines whether the density bears a predetermined relationship to (e.g., exceeds) a threshold at decision diamond 66. If so, the logic proceeds to block 68 to invoke the logic of FIG. 4. On the other hand, if either the density or the discontinuity count threshold is not met (or after invoking the logic of FIG. 4 at block 68 if it is), the logic proceeds to decision diamond 70 in FIG. 3.

Figure 3:
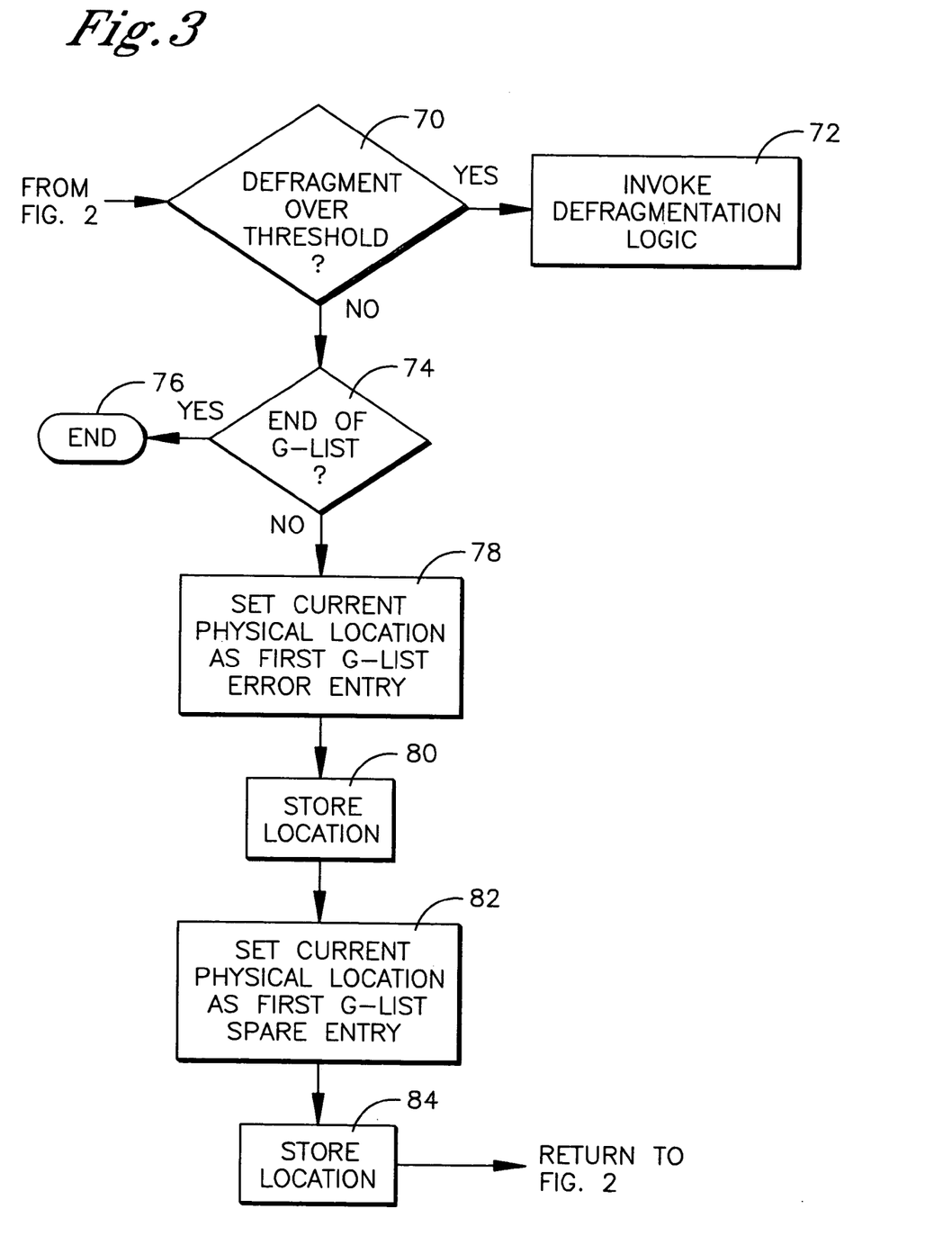
FIG. 3 is a continuation of the logic of FIG. 2.
Figure 5:
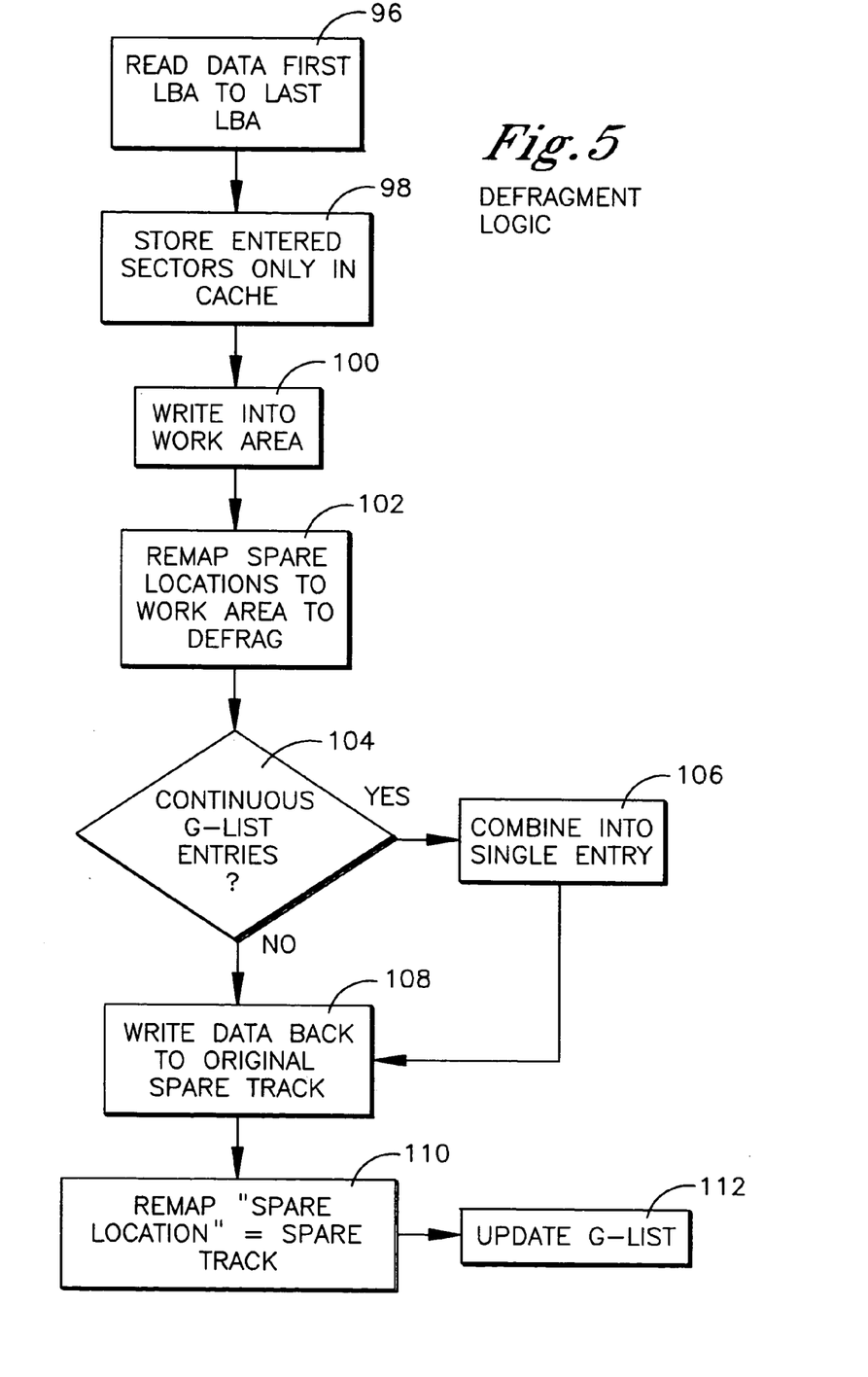
FIG. 5 is a flow chart of the defragmentation logic.

At decision diamond 70 in FIG. 3, it is determined whether the defragmentation count bears a predetermined relationship to (e.g., exceeds) a threshold. If it does, the defragmentation logic of FIG. 5 is invoked at block 72, but if not the logic tests whether the end of the G-list has been arrived at in decision diamond 74 and ends at state 76 if it has. If the end of the G-list has not been arrived at, the logic moves to block 78 to set the current physical location of the last-listed error entry in the G-list (in the first iteration, the location obtained at block 42 in FIG. 2) to be the "first" error location for purposes of repeating the above logic. The location is stored at block 80. Proceeding to block 82 the current physical location of the last-listed spare entry in the G-list (in the first iteration, the location obtained at block 46 in FIG. 2) to be the "first" spare location for purposes of repeating the above logic. The location is stored at block 84, and the logic returns to block 42 in FIG. 2 to proceed as described above.

Figure 4:
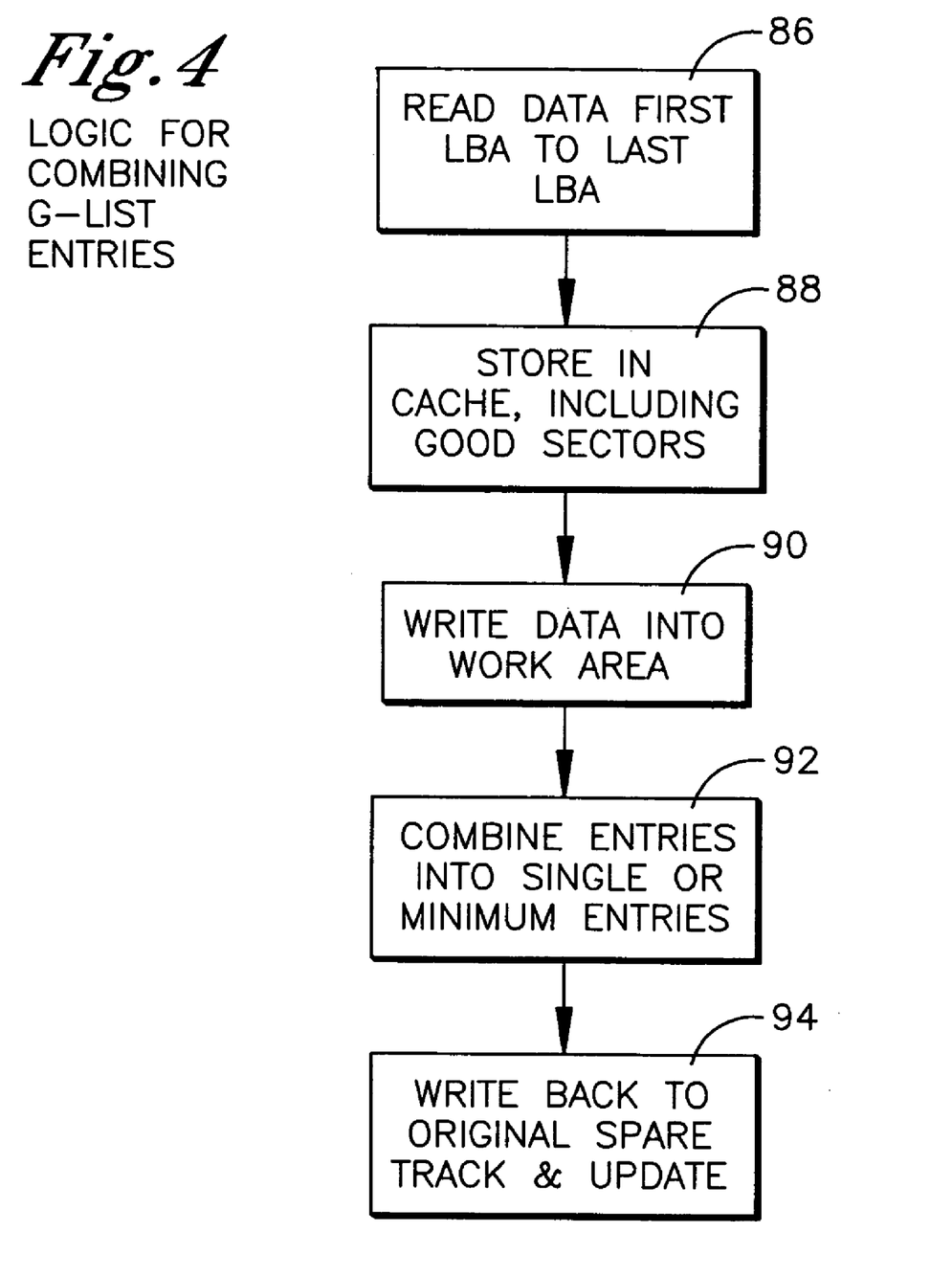
FIG. 4 is a flow chart of the logic for combining multiple G-list entries.

FIG. 4 shows the logic for combining G-list spare LBA entries. Commencing at block 86, data is read from the "first" LBA location in the FIG. 2 logic to the last LBA location. This data, including intervening good sectors if any, is stored in cache at block 88. At block 90 the data is written into a work area that is separate from a spare area, and then entries are combined at block 92 into a single or a minimal number of entries. The combined entries are then reassigned back to the original spare track at block 94, and the G-list is updated.

By "combining entries" is meant that a single G-list entry now refers to at least two sectors, e.g., in the simplest case when only two G-list entries are being combined, the last G-list entry is discarded, and its spare sector is listed under the LBA of the spare sector of the first G-list entry, along with the first spare sector.

FIG. 5 shows the defragmentation logic. Commencing at block 96, data is read from the "first" LBA location in the FIG. 2 logic to the last LBA location. This data but not intervening good sectors if any, is stored in cache at block 98. At block 100 the data is written into a work area that is separate from a spare area, and then at block 102 the spare locations are remapped to the work area. The spare locations can be defragmented in the work area, which is facilitated because in the work area they are arranged in LBA order.

Accordingly, proceeding to decision diamond 104 it is determined whether continuous G-list entries (as indicated by sequential LBAs) are in the work area. If so, the continuous entries are defragmented by combining them at block 106 into a single entry. The logic then moves to block 108 to write the now-defragmented data back to the original spare track. Moving to block 110, the spare location in the G-list is remapped to the spare track by indicating that the LBA of the spare location is physically located on the spare track. The G-list is updated for the above operations at block 112.

While the particular SYSTEM AND METHOD FOR ONBOARD HDD DEFRAGMENTATION AND COMBINING MULTIPLE G-LIST ENTRIES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We claim:

1. A hard disk drive (HDD), comprising:
   at least one disk storing data; and
   at least one disk controller configured for accessing at least one grown defect list (G-list) to defragment the disk and to combine entries in the G-list, wherein the controller determines whether to invoke defragmentation based at least in part on a defragmentation count and wherein the defragmentation count is incremented if spare sectors in the G-list are not ordered.

2. A hard disk drive (HDD), comprising:
   at least one disk storing data; and
   at least one disk controller configured for accessing at least one grown defect list (G-list) to defragment the disk and to combine entries in the G-list, wherein the controller determines whether to invoke defragmentation based at least in part on a defragmentation count and wherein the defragmentation count is incremented if spare sectors in the G-list are not ordered by size, from small to big.

3. A hard disk drive (HDD), comprising:
   at least one disk storing data; and
   at least one disk controller configured for accessing at least one grown defect list (G-list) to defragment the disk and to combine entries in the G-list, wherein at least one of: defragmentation, and (G-list) entry combination, is not performed unless the HDD is in at least one of: an idle state, and a self-test state.

4. The HDD of claim 3, wherein neither defragmentation nor G-list entry combination is performed unless the HDD is in an idle state or a self-test state.

5. A hard disk drive (HDD), comprising:
   at least one disk storing data; and
   at least one disk controller configured for accessing at least one grown defect list (G-list) to defragment the disk and to combine entries in the G-list, wherein the controller determines whether to invoke G-list entry combination based at least in part on a discontinuity count.

6. The HDD of claim 5, wherein the discontinuity count is incremented if at least two successive entries in the G-list are physically located on the same track in the same head and cylinder.

7. The HDD of claim 5, wherein the controller determines whether to invoke G-list entry combination based at least in part on the discontinuity count and a density.

8. The HDD of claim 6, wherein the controller determines whether to invoke G-list entry combination based at least in part on the discontinuity count and a density.

9. The HDD of claim 7, wherein the density represents at least in part the quotient of the difference between two physical locations of G-list entries and the discontinuity count.

10. The HDD of claim 9, wherein the difference is between a physical location of a sector represented by a first G-list entry and a physical location of a sector represented by a last G-list entry.

11. A chip configured for placement within a hard disk drive (HDD) having at least one disk, the chip configured for logic comprising at least one of:
    defragmenting data in the HDD; and
    combining at least two entries on a grown defects list (G-list) into a single entry on the list, wherein the chip is configured for executing both the defragmenting and combining logic.

12. The chip of claim 11, wherein the chip determines whether to invoke defragmentation based at least in part on a defragmentation count.

13. The chip of claim 12, wherein the defragmentation count is incremented if spare sectors in the G-list are not ordered.

14. The chip of claim 12, wherein the defragmentation count is incremented if spare sectors in the G-list are not ordered by size, from small to big.

15. A chip configured for placement within a hard disk drive (HDD) having at least one disk, the chip configured for logic comprising at least one of:
    defragmenting data in the HDD; and
    combining at least two entries on defects list (G-list) into a single entry on the list, wherein at least one of: defragmentation, and G-list entry combination, is not performed unless the HDD is in at least one of: an idle state, and a self-test state.

16. The chip of claim 15, wherein neither defragmentation nor G-list entry combination is performed unless the HDD is in an idle state or a self-test state.

17. A chip configured for placement within a hard disk drive (HDD) having at least one disk, the chip configured for logic comprising at least one of:
    defragmenting data in the HDD; and
    combining at least two entries on a grown defects list (G-list) into a single entry on the list, wherein the chip determines whether to invoke G-list entry combination based at least in part on a discontinuity count.

18. The chip of claim 17, wherein the discontinuity count is incremented if at least two successive entries in the G-list are physically located on the same track in the same head and cylinder.

19. The chip of claim 17, wherein the chip determines whether to invoke G-list entry combination based at least in part on the discontinuity count and a density.

20. The chip of claim 18, wherein the chip determines whether to invoke G-list entry combination based at least in part on the discontinuity count and a density.

21. The chip of claim 20, wherein the density represents at least in part the quotient of the difference between two physical locations of G-list entries and the discontinuity count.

22. The chip of claim 21, wherein the difference is between a physical location of a sector represented by a first G-list entry and a physical location of a sector represented by a last G-list entry.

23. In a hard disk drive (HDD) having a grown defects list (G-list):
    means for combining at least two G-list entries under one logical block address (LBA); and
    means for defragmenting information in the HDD, wherein the means for defragmenting defragments based at least in part on whether spare sectors in the G-list are not ordered.

24. In a hard disk drive (HDD) having a grown defects list (G-list):
    means for combining at least two G-list entries under one logical block address (LBA); and means for defragmenting information in the HDD, wherein the means for defragmenting defragments based at least in part on whether spare sectors in the G-list are not ordered by size, from small to big.

25. In a hard disk drive (HDD) having a grown defects list (G-list):
means for combining at least two G-list entries under one logical block address (LBA); and
means for defragmenting information in the HDD, wherein neither means executes unless the HDD is in an idle or a self-test state.

26. In a hard disk drive (HDD) having a grown defects list (G-list):
means for combining at least two G-list entries under one logical block address (LBA), wherein the means for combining executes at least in part based on whether at least two successive entries in the G-list are physically located on the same track in the same head and cylinder.

* * * * *